(12) United States Patent
Huang et al.

(10) Patent No.: US 11,239,907 B2
(45) Date of Patent: Feb. 1, 2022

(54) CALL PROCESSING METHOD AND DEVICE

(71) Applicant: Hytera Communications Corporation Limited, Shenzhen (CN)

(72) Inventors: Chengfu Huang, Shenzhen (CN); Hailiang Zhang, Shenzhen (CN); Yan Xu, Shenzhen (CN)

(73) Assignee: Hytera Communications Corporation Limited, Shenzhen (CN)

( * ) Notice: Subject to any disclaimer, the term of this patent is extended or adjusted under 35 U.S.C. 154(b) by 79 days.

(21) Appl. No.: 15/781,739

(22) PCT Filed: Dec. 7, 2015

(86) PCT No.: PCT/CN2015/096547
§ 371 (c)(1),
(2) Date: Dec. 5, 2018

(87) PCT Pub. No.: WO2017/096507
PCT Pub. Date: Jun. 15, 2017

(65) Prior Publication Data
US 2019/0097718 A1    Mar. 28, 2019

(51) Int. Cl.
*H04B 7/26*    (2006.01)
*H04W 4/16*    (2009.01)
(Continued)

(52) U.S. Cl.
CPC ............ *H04B 7/2612* (2013.01); *H04M 3/42* (2013.01); *H04W 4/16* (2013.01); *H04W 48/16* (2013.01);
(Continued)

(58) Field of Classification Search
CPC ............ H04B 7/2612; H04B 7/18567; H04W 76/10; H04W 48/16; H04W 4/16;
(Continued)

(56) References Cited

U.S. PATENT DOCUMENTS 4,794,649 A * 12/1988 Fujiwara ........... H04W 52/0229
455/9
5,381,415 A * 1/1995 Mizutani ............ H04Q 11/0428
370/447
(Continued)

FOREIGN PATENT DOCUMENTS

CN    101155389 A    4/2008
CN    102893691 A    1/2013
(Continued)

OTHER PUBLICATIONS

Search Report for European Patent Application No. 15909982.9 dated Jun. 26, 2019.
(Continued)

*Primary Examiner* — Shaima Q Aminzay
(74) *Attorney, Agent, or Firm* — Calfee Halter & Griswold LLP

(57) ABSTRACT

The embodiments of the present invention disclose a call processing method and device. The call processing method comprises: sending, by a repeater of the first site, a first call establishment request to a repeater of the second site according to a call request initiated by a first terminal, the first call establishment request comprising an identification of the second terminal; determining, by the repeater of the first site, whether a second call establishment request is received before a call establishment response sent by the repeater of the second site is received, the second call establishment request being sent by the repeater of the second site according to a call request initiated by the second terminal; and if yes, sending, by the repeater of the first site, a call collision notification to the first terminal to notify the first terminal to delay the call.

17 Claims, 5 Drawing Sheets

(51) Int. Cl.
  *H04W 48/16*    (2009.01)
  *H04M 3/42*     (2006.01)
  *H04W 76/10*    (2018.01)
  *H04W 84/08*    (2009.01)

(52) U.S. Cl.
  CPC ........... *H04W 76/10* (2018.02); *H04W 84/08* (2013.01); *H04M 2201/14* (2013.01); *H04M 2201/22* (2013.01)

(58) Field of Classification Search
  CPC ....... H04W 84/08; H04W 64/00; H04W 8/26; H04W 60/005; H04W 60/04; H04W 8/12; H04W 40/02; H04W 92/10; H04W 92/18; H04M 3/42; H04M 2201/22; H04M 2201/14; H04M 3/22; H04M 3/428; H04M 3/436; H04M 7/0027; H04M 2207/18; H04M 11/022; H04L 63/08; H04Q 3/0025
  USPC .......................................................... 455/15
  See application file for complete search history.

(56) References Cited

U.S. PATENT DOCUMENTS

| | | | | |
|---|---|---|---|---|
| 6,141,347 | A * | 10/2000 | Shaughnessy | H04W 84/08 370/312 |
| 8,582,745 | B1 * | 11/2013 | Chitnis | H04M 3/42 379/207.05 |
| 2004/0151138 | A1 * | 8/2004 | Paltemaa | H04L 65/4038 370/329 |
| 2006/0160531 | A1 | 7/2006 | Park et al. | |
| 2007/0121831 | A1 * | 5/2007 | Kim | H04M 3/42 379/93.31 |
| 2008/0279358 | A1 * | 11/2008 | Kim | H04M 3/42 379/208.01 |
| 2010/0056193 | A1 * | 3/2010 | LoGalbo | H04W 48/08 455/511 |
| 2010/0142434 | A1 * | 6/2010 | Rodmell | H04W 88/02 370/315 |
| 2012/0021751 | A1 * | 1/2012 | Zhang | H04M 3/42059 455/445 |
| 2014/0254458 | A1 | 9/2014 | Panpaliya et al. | |

FOREIGN PATENT DOCUMENTS

| | | |
|---|---|---|
| CN | 103402030 A | 11/2013 |
| CN | 103957330 A | 7/2014 |
| CN | 104427142 A | 3/2015 |
| CN | 104734823 A | 6/2015 |
| CN | 105338503 A | 2/2016 |
| EP | 2259658 A1 | 12/2010 |
| EP | 2416548 A1 | 2/2012 |
| EP | 3035762 A1 | 6/2016 |
| JP | 2015207924 A | 11/2015 |
| WO | 2010111830 A1 | 10/2010 |
| WO | 2015021588 A1 | 2/2015 |

OTHER PUBLICATIONS

Search Report and Written Opinion for International Application No. PCT/CN2015/096547 dated Sep. 6, 2016.
Communication Under Rule 71(3) EPC from European Patent Application No. 15909982.9 dated May 25, 2020.

\* cited by examiner

CALL PROCESSING METHOD AND DEVICE

TECHNICAL FIELD

The present invention relates to the field of communications technologies, and in particular, to a call processing method and device.

BACKGROUND

In a centralized trunking communication system, there is a dedicated channel serving as a control channel. The control channel is used to transmit control signaling. A terminal usually waits in the control channel. Each time a call is made, a request is sent from the control channel to the trunking system, and the trunking system allocates a traffic channel for the terminal, and then notifies the terminal to switch back to the service channel again. The terminal also needs to return to the control channel after the call ends. This requires that the control channel always maintains a long transmission state, and one channel is specially reserved as a control channel which is a waste of one channel, eventually resulting in high system cost and complexity.

In a distributed trunking communication system, the system cost and complexity are low, but the call state information between various sites cannot be managed uniformly. When terminals under different sites initiate the same call at the same time, the calls of the two terminals may be accessed at the same time but the two terminals cannot successfully call each other, i.e., the current distributed trunking communication system is prone to a call collision, and has a low access success rate.

SUMMARY OF THE INVENTION

In view of this, the embodiments of the present invention provide a call processing method and device, which can avoid the call collision and increase the access success rate.

According to a first aspect, an embodiment of the prevent invention provides a call processing method applied to a call processing system comprising a first site and a second site, wherein the method comprises:

sending, by a repeater of the first site, a first call establishment request to a repeater of the second site according to a call request initiated by a first terminal within the site, the call request of the first terminal being a call request initiated to a second terminal within the second site, and the first call establishment request comprising an identification of the second terminal;

judging, by the repeater of the first site, whether a second call establishment request sent by the repeater of the second site is received before a call establishment response sent by the repeater of the second site is received, the second call establishment request being sent by the repeater of the second site according to a call request initiated by the second terminal to the first terminal, and the second call establishment request comprising an identification of the first terminal; and if yes, sending, by the repeater of the first site, a call collision notification to the first terminal to notify the first terminal to delay the call.

According to a second aspect, an embodiment of the prevent invention provides a call processing device which is a repeater. The call processing device comprises:

a sending unit, configured to send a first call establishment request to a repeater of other sites according to a call request initiated by a first terminal within the site, the call request of the first terminal being a call request initiated to a second terminal within the other sites, and the first call establishment request comprising an identification of the second terminal;

a receiving unit, configured to receive a call establishment response sent by the repeater of the other sites, and receive a second call establishment request sent by the repeater of the other sites, the second call establishment request being sent by the repeater of the other sites according to a call request initiated by the second terminal to the first terminal, and the second call establishment request comprising an identification of the first terminal; and a judging unit, configured to judge whether the second call establishment request sent by the repeater of the other sites is received before the call establishment response sent by the repeater of the other sites is received.

The sending unit is also configured to, when the judgment result of the judging unit is yes, send a call collision notification to the first terminal to notify the first terminal to delay the call.

According to a third aspect, a repeater provided by an embodiment of the present invention comprises a transceiver and a processor.

The transceiver is configured to send a first call establishment request to a repeater of other sites according to a call request initiated by a first terminal within the site, the call request of the first terminal being a call request initiated to a second terminal within the other sites, and the first call establishment request comprising an identification of the second terminal; and the processor is configured to judge whether the transceiver receives a second call establishment request sent by the repeater of the other sites before a call establishment response sent by the repeater of the other sites is received, the second call establishment request being sent by the repeater of the second site according to a call request initiated by the second terminal to the first terminal; and if yes, control the transceiver to send a call collision notification to the first terminal to notify the first terminal to delay the call.

It can be seen from the above technical solutions that the embodiments of the present invention have the following advantages:

In the embodiments of the present invention, the repeater of the first site, after sending the first call establishment request to the repeater of the other sites according to the call request initiated by the first terminal to the second terminal, judges whether the second call establishment request sent by the repeater of other sites is received before the call establishment response returned by other repeaters to the first call establishment request is received. The second call establishment request is sent by the repeater of the other sites according to the call request initiated by the second terminal to the first terminal; if the second call establishment request sent by the repeater of the other sites is received before the call establishment response returned by the repeater of the other sites is received, then, it is determined that the call collision exists, and the repeater of the first site sends the call collision notification to the first terminal, and the first terminal delays the call according to the call collision notification, thus avoiding the call collision and improving the access success rate.

BRIEF DESCRIPTION OF DRAWINGS

In order to illustrate the technical solutions in the embodiments of the present invention more clearly, the drawings used in the embodiments will be briefly described below. Obviously, the drawings in the following description are merely some embodiments of the present invention. For those of ordinary skill in the art, other drawings may also be obtained based on these drawings without any creative work.

DETAILED DESCRIPTION

The following describes the technical solutions in the embodiments of the present invention with reference to the accompanying drawings in the embodiments of the present invention. Apparently, the described embodiments are merely some but not all of the embodiments of the present invention. Based on the embodiments of the present invention, all other embodiments obtained by those having ordinary skill in the art without going through any creative work shall fall within the scope of protection of the present invention.

The embodiments of the present invention provide a call processing method and device, which can avoid the call collision and increase the access success rate. The call processing method provided by the embodiments of the present invention is applied to a call processing system. The call processing system may be a distributed trunking communication system in which no dedicated channel serves as a control channel. The system is composed of multiple sites. There are several repeaters within each site to provide a shared channel, which comprises a fixed master repeater and multiple slave repeaters. One repeater corresponds to several logical channel slots, for example, in a Digital Mobile Radio (DMR) system, one repeater corresponds to two logical channel slots. An idle terminal user always intercepts the master repeater allocated by the system preferentially. If the master repeater comprises a free slot, one call is always started in the master repeater thereof preferentially. When the master repeater is busy (all channel slots of the repeater are occupied), the master repeater will embed information of free repeaters within the site into broadcast information while broadcasting voice or data information. Terminals that do not participate in the activity of the master repeater can quickly switch to the free repeater to transmit or intercept system broadcast information. The free repeater is a repeater that is pre-designated from a predetermined type of repeaters, and the predetermined type of repeaters are slave repeaters having at least one idle logical channel slot. There is only one free repeater in one site at the same time. Specifically, in the embodiments of the present invention, the distributed trunking communication system comprises a first site and a second site.

Figure 1:
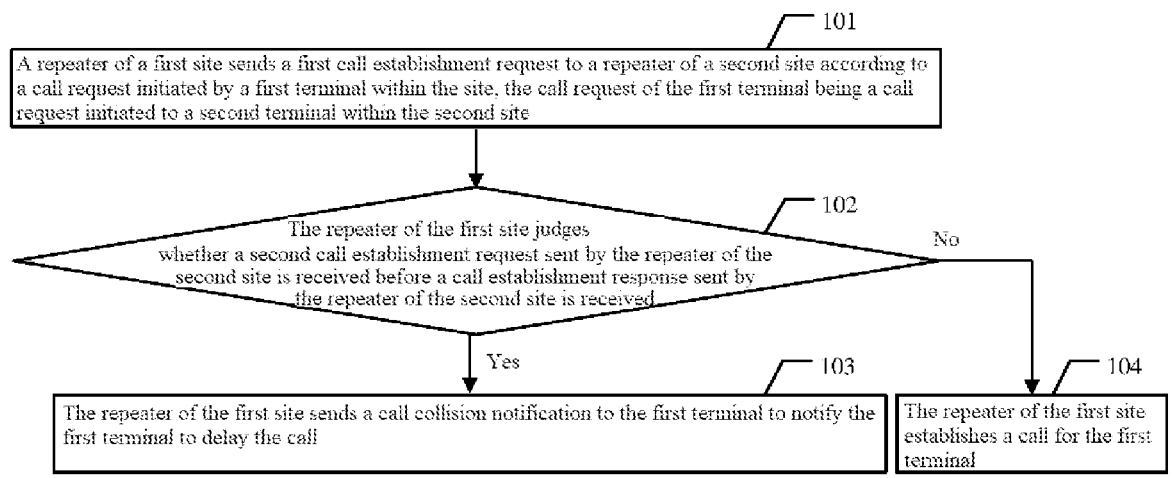
FIG. 1 is a schematic flowchart of the call processing method according to an embodiment of the present invention.

Referring to FIG. 1, an embodiment of a call processing method according to the present invention comprises the following steps.

In 101, a repeater of the first site sends a first call establishment request to a repeater of the second site according to a call request initiated by a first terminal within the site, the call request of the first terminal being a call request initiated to a second terminal within the second site, and the first call establishment request comprising an identification of the second terminal.

In specific implementation, the repeater of the first site may be a free repeater of the first site. Each site in a call processing system may maintain a free repeater list thereof, so that the call request can be initiated between the free repeaters of respective sites, so as to reduce unnecessary information interaction.

In 102, the repeater of the first site judges whether a second call establishment request sent by the repeater of the second site is received before a call establishment response sent by the repeater of the second site is received, the second call establishment request being sent by the repeater of the second site according to a call request initiated by the second terminal to the first terminal, and the second call establishment request comprising an identification of the first terminal. If yes, step 103 is performed; otherwise, step 104 is performed.

In the embodiment, the site where the first terminal is located in the system is the first site, and other sites in the system other than the first site are the second site, and the number of the second site may be one or more than one.

When the number of the second sites is more than one, the second terminal can be within any one of the second sites; if the repeater of the first site receives the second call establishment request sent by the repeater of any one of the second sites before the call establishment response sent by the repeater of any one of the second sites is received, then the repeater of the first site can determine that the first terminal and the second terminal have initiated calls to each other simultaneously according to the identifications of the terminals carried in the two call establishment requests, and that a call collision has occurred. If the repeater of the first site does not receive the second call establishment request sent by the repeater of any one of the second sites before the call establishment responses sent by the repeaters of all the second sites are received, then it is determined that no call collision has occurred.

In 103, the repeater of the first site sends a call collision notification to the first terminal to notify the first terminal to delay the call.

When the repeater of the first site determines that a call collision has occurred, the repeater of the first site sends a call collision notification to the first terminal to notify the first terminal to delay the call. When a call collision occurs, the repeater of the second site where the second terminal is located will also send a call collision notification to the second terminal. The second terminal will also suspend the call after the call collision notification is received. The first terminal and the second terminal will randomly re-initiate the call after retreating respectively. Theoretically, random calls will not be initiated at the same time after the retreating. In this way, the call request initiated first will be accessed, and the call initiated subsequently will be rejected, so that the call collision can be avoided, and the access success rate can be improved.

In addition, after the repeater of the first site determines that a call conflict has occurred, a call collision report may also be sent to the repeater of the second site. The call collision report is used to inform the repeater of the second site of a call conflict and a coping strategy of the repeater of the first site to the call collision. The coping strategy of the repeater of the first site to the call collision may be that the repeater of the first site notifies the first terminal to retreat the call, and may alternatively be that the repeater of the first site does notify the first terminal to retreat the call.

If the coping strategy carried in the call collision report is that the repeater of the first site notifies the first terminal to retreat the call, then the repeater of the second site may not notify the second terminal to retreat the call; if the coping strategy carried in the call collision report is that the repeater of the first site does not notify the first terminal to retreat the call, then the repeater of the second site may notify the second terminal to retreat the call, so as to further improve the access success rate.

In 104, the repeater of the first site establishes a call for the first terminal.

If the repeater of the first site determines that no call collision has occurred, then the repeater of the first site will establish a call for the first terminal. The terminal mentioned in the embodiment of the present invention may be an interphone.

Figure 2:
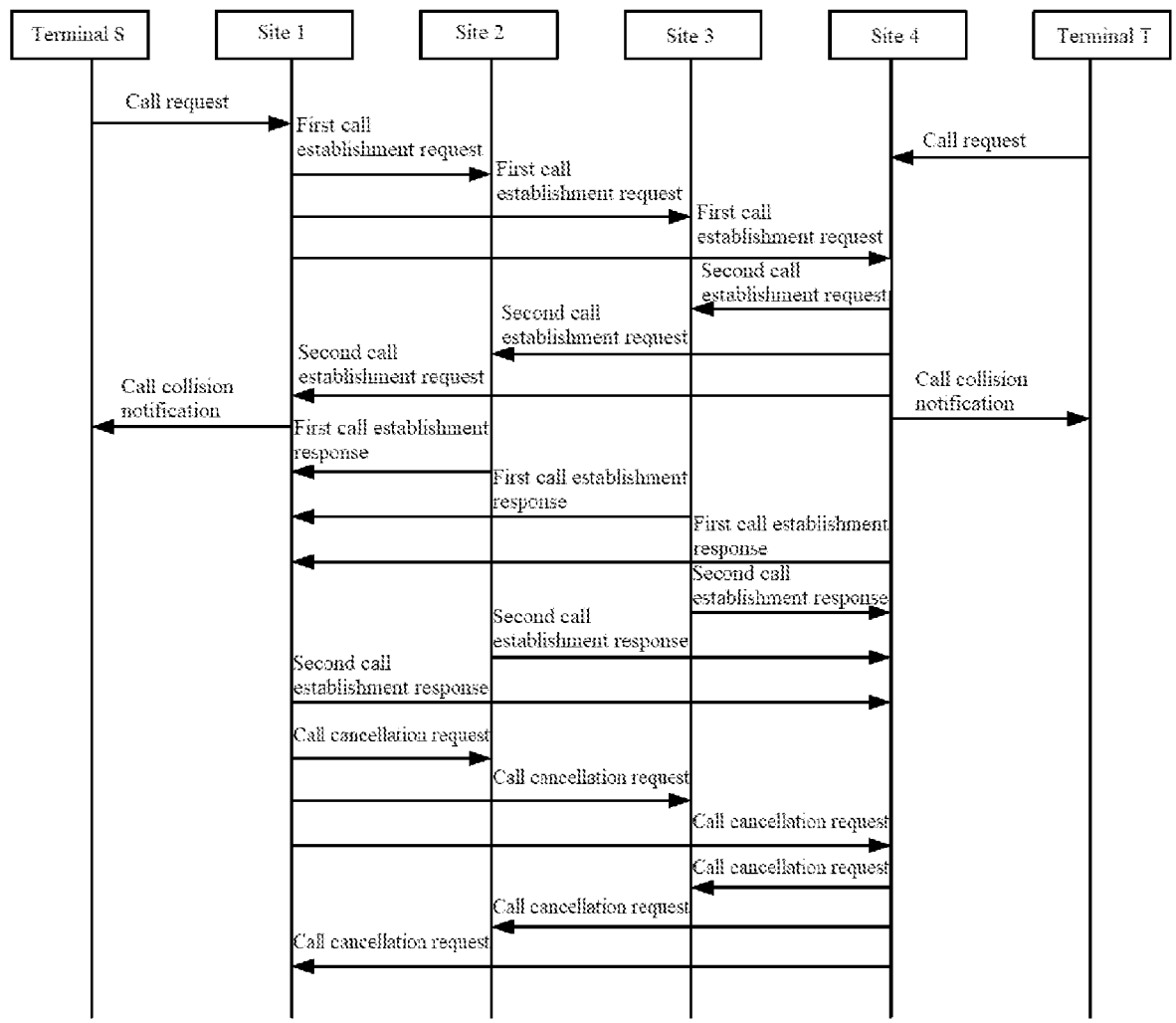
FIG. 2 is a signaling interaction schematic diagram of the call processing method according to an embodiment of the present invention.

Please refer to FIG. 2, which is a signaling interaction schematic diagram of the call processing method according to the embodiment of the present invention. In FIG. 2, it can be deemed that the call processing system comprises four sites which comprise a site 1, a site 2, a site 3, and a site 4. The first terminal is terminal S, so the first site is the site 1, and the second site is the site 2, the site 3 and the site 4. The second terminal is terminal T, and the terminal T is located at the site 4. Of course, in specific implementation, the number of sites in the call processing system may also be other values. The definition or setting of the first site, the second site, the first terminal, and the second terminal may also be in other manners. It is only exemplary and explanatory here, and is not specifically limiting.

In FIG. 2, the terminal S and the terminal T respectively initiate a call request to the each other within the sites 1 and 4 almost simultaneously, and a repeater of the site 1 respectively sends a first call establishment request to repeaters of the sites 2, 3 and 4 according to the call request of the terminal S. The repeater of the site 4 sends a second call establishment request to the repeaters of the sites 1, 2, and 3 respectively according to the call request of the terminal T. The repeater of the site 1 receives the second call establishment request sent by the repeater of the site 4 before first call establishment responses sent by the repeaters of the sites 2, 3, and 4, so the repeater of the site 1 sends a call collision notification to the terminal S to notify the terminal S to delay the call. Similarly, the repeater of the site 4 receives the first call establishment request sent by the repeater of the site 1 before the second call establishment response sent by the repeaters of the sites 1, 2, and 3 is received, so the repeater of the site 4 sends a call collision notification to the terminal T to notify the terminal T to delay the call. After that, the repeater of the site 1 can send a call cancellation request to the repeaters of the sites 2, 3 and 4, and the repeater of the site 4 can send a call cancellation request to the repeaters of the sites 1, 2, and 3, in order to cancel the call. The terminal S may initiate a call again after a period of time. In this case, if the terminal T does not initiate a call again, or the call initiated again by the terminal T does not conflict with the terminal S, the terminal S will be accessed and the call is successful.

In FIG. 2, the call request initiated by the terminal S may be a personal call request or a group call request. If the call request initiated by the terminal S is a personal call request, for example, the terminal S calls the terminal T, and no call collision occurs, a method for establishing a personal call for the terminal S may refer to FIG. 3.

Figure 3:
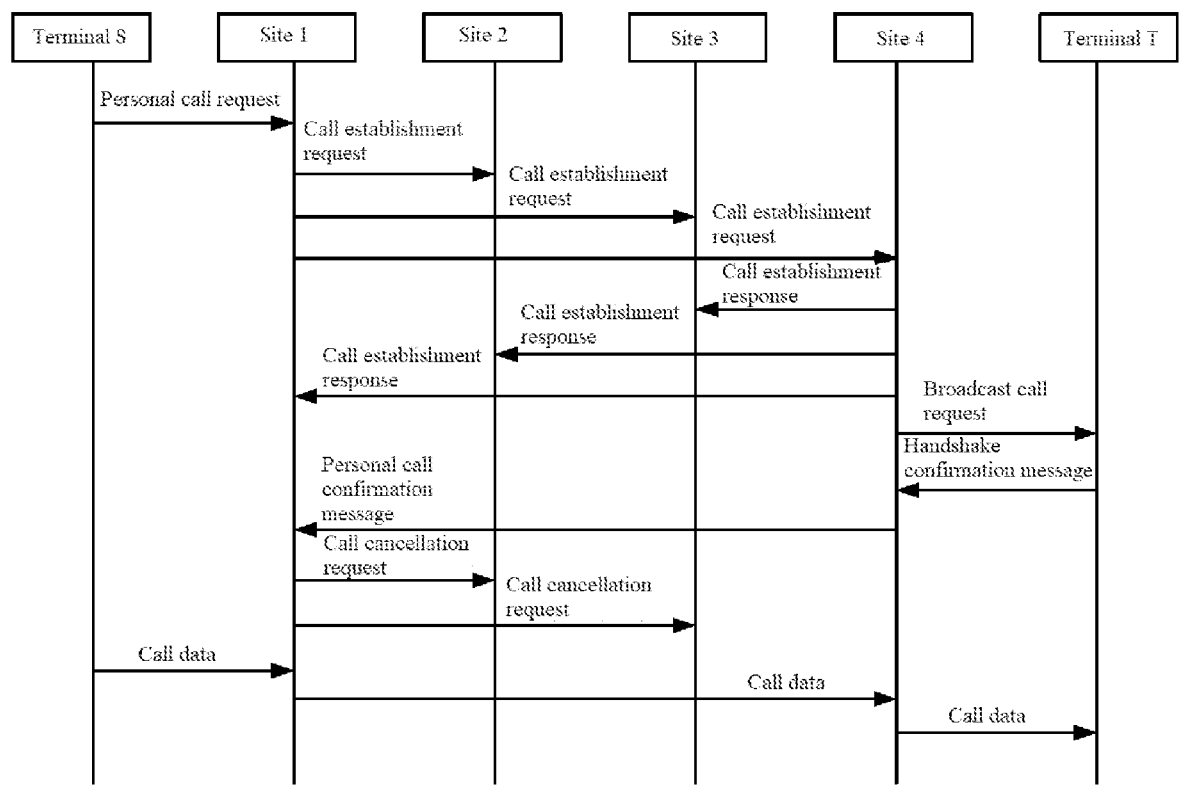
FIG. 3 is another signaling interaction schematic diagram of the call processing method according to an embodiment of the present invention.

In FIG. 3, the terminal S initiates a personal call request to the repeater of the site 1, and the personal call request may comprise an identification (ID) of the calling terminal S, an ID of the called terminal T, and the like. At this time, the repeater of the site 1 does not know which site the terminal T is located at. Therefore, the repeater of the site 1 will send a call establishment request to the repeaters of the sites 2, 3 and 4, and the repeaters of the sites 2, 3 and 4 will send a call establishment response to the repeater of the site 1 to allow access after the call establishment request sent by the repeater of the site 1 is received. At the same time, the repeater of the site 4 will broadcast the call establishment request to the terminal T. If the terminal T is in an idle state, then the terminal T will feed back a handshake confirmation message to the repeater of the site 4 (if the terminal T is busy, then the call is rejected). The handshake confirmation message may contain the ID of the terminal S and the ID of the terminal T. After receiving the handshake confirmation message of the terminal T, the repeater of the site 4 feeds back a personal call confirmation message to the repeater of the site 1. After receiving the personal call confirmation message, the repeater of the site 1 determines that the site 4 that feeds back the personal call confirmation message is a personal call participating site. The repeater of the site 1 sends a call cancellation request to the repeaters of the sites 2 and 3 to cancel the call established with the repeaters of the sites 2 and 3, and release radio resources. When the repeater of the site 1 receives the call data sent by the terminal S, the call data is sent only to the personal call participating site determined, i.e., the site 4, and then the repeater of the site 4 sends the personal call data to the terminal T so as to establish a personal call. The call data may comprise voice headers, voice frames and other data.

In the above embodiment, when the terminal initiates a cross-site personal call, the site where the terminal is located performs cross-site handshake first, determines a personal call participating site, and ensures that the call is initiated between sites that are required to participate, so as to reduce unnecessary radio occupation and save resources.

Figure 4:
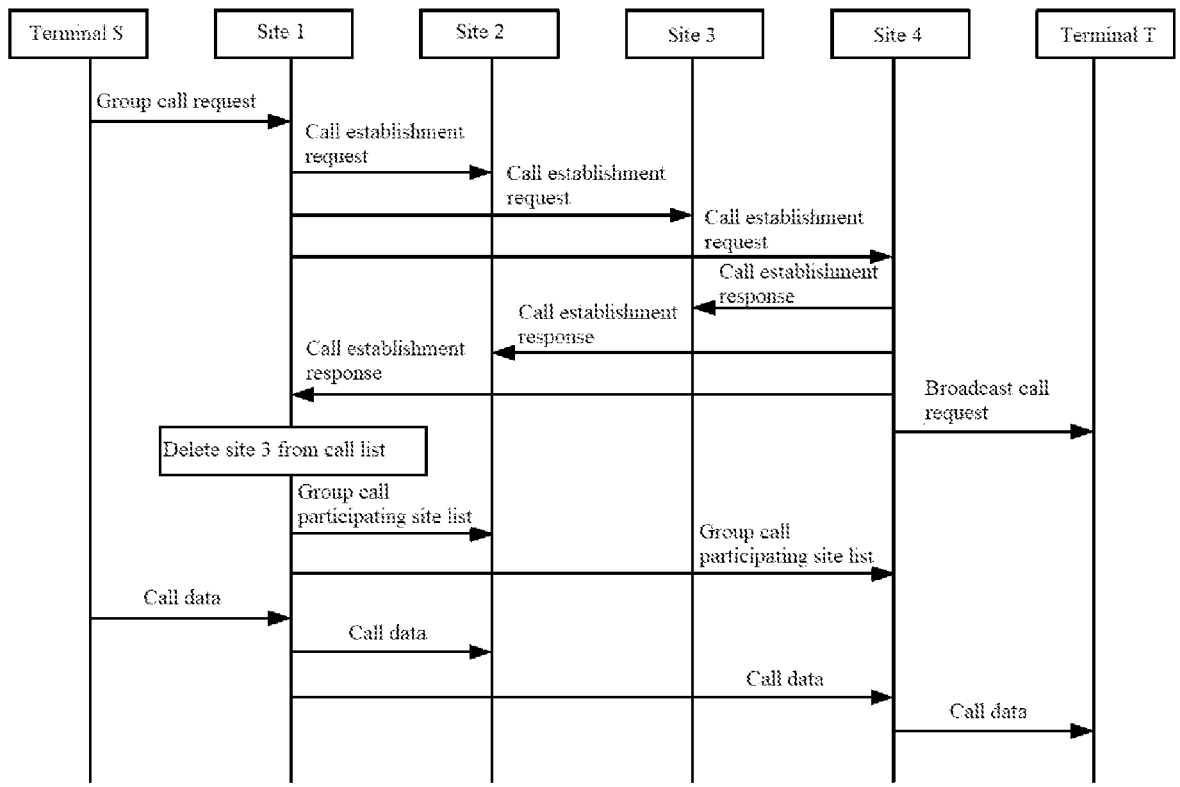
FIG. 4 is another signaling interaction schematic diagram of the call processing method according to an embodiment of the present invention.

In FIG. 2, if the call request initiated by the terminal S is a group call request, and no call collision occurs, a method for establishing a group call for the terminal S may refer to FIG. 4.

In FIG. 4, the repeater of each site can be pre-configured or stored with a respective intra-site group call list, and each intra-site group call list comprises information such as an identification of a call group supported by the corresponding site. For example, an intra-site group call list (1, 2, 3, 4, 5) is configured for the site 1, an intra-site group call list (1, 2, 3, 6, 7) is configured for the site 2, an intra-site group call list (1, 3, 4, 8, 9) is configured for the site 3, and an intra-site group call list (1, 4, 5, 10, 11) is configured for the site 4. When the terminal within the site 1 initiates a group call with a call group ID of 1, all the sites 1, 2, 3, and 4 will participate in the group call; when the terminal within the site 1 initiates a group call with a call group ID of 2, only the site 1 and the site 2 participate in the group call; when the terminal within the site 2 initiates a group call with a call group ID of 3, only the sites 1, 2 and 3 participate in the group call; when the terminal within the site 4 initiates a group call with a call group ID of 5, only the site 1 and the site 4 participate in the group call; and when the terminal within the site 4 initiates a group call with a call group ID of 10, only the site 4 participates in the group call.

In specific, in FIG. 4, the terminal S initiates a group call request to the repeater of the site 1, and the group call request may comprise an ID of the terminal S, an ID of the called terminal T, an ID of the group call, and the like. At this time, the repeater of the site 1 does not know which sites are required to participate in this call. Therefore, the repeater of the site 1 will send a call establishment request to the repeaters of the sites 2, 3 and 4 (if the intra-site group call list of the site comprises the ID of the call group requested by the terminal S, then a result code carried in the sent call establishment response is to allow access; if the intra-site group call list of the site does not comprise the ID of the call group requested by the terminal S, then the result code carried in the sent call establishment response is that the group call identification is not in the intra-site group call list) after the call establishment request sent by the repeater of the site 1 is received. The repeater of the site 1 determines the group call participating sites according to result codes carried in the call establishment responses fed back by the repeaters of the sites 2, 3 and 4. In this embodiment, if the result code carried in the call establishment response fed back by the repeater of the site 3 is that the group call ID is not in the intra-site group call list, then the repeater of the site 1 will delete the site 3 from the call list and determine that the sites 1, 2 and 4 are group call participating sites, and then send a group call participating site list to the repeaters of the sites 2 and 4 for the use of the repeaters of the sites 2 and 4 during callback. When the repeater of the site 1 receives the call data sent by the terminal S, the call data is sent only to the group call participating sites determined, i.e., the sites 2 and 4, and then the repeaters of the sites 2 and 4 send the call data to the respective terminals so as to establish a group call. The call data may comprise voice headers, voice frames and other data.

In the above embodiment, when the terminal initiates a cross-site group call, the site where the terminal is located performs cross-site handshake first, determines group call participating sites, and ensures that the call is initiated between sites that are required to participate, so as to reduce unnecessary radio occupation and save resources.

When the group call is in a maintained phase, the terminals within multiple different sites may press a callback key simultaneously to call back, which may cause a callback collision. In response to this problem, the embodiment of the present invention proposes the following solution. Please refer to FIG. 5.

Figure 5:
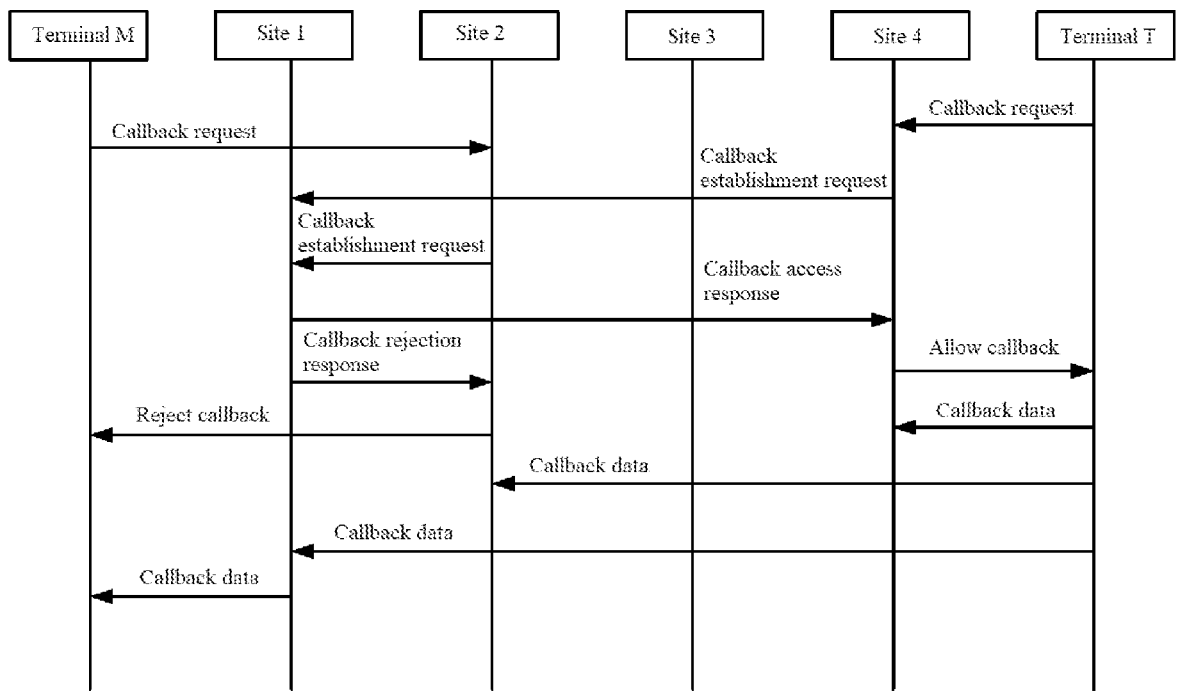
FIG. 5 is another signaling interaction schematic diagram of the call processing method according to an embodiment of the present invention.

In FIG. 5, when the group call is in the maintained phase, a terminal M within the site 2 and a terminal T within the site 4 initiate a callback requests almost simultaneously. The repeater of the site 4 precedes the repeater of the site 2 to send a callback establishment request to the repeater of the site 1 according to the callback request of the terminal T. After receiving the callback establishment request sent by the repeater of the site 4, the repeater of the site 1 feeds back a callback access response to the repeater of the site 4 to allow the access of the site 4; after receiving the callback establishment request sent by the repeater of the site 2, the repeater of the site 1 finds that it is making a callback with the site 4, then a callback reject response is sent to the repeater of the site 2 to reject the access of the site 2. The repeaters of the site 2 and the site 4 respectively feed back a request result to the terminal M and the terminal T. The terminal M stops the callback request according to the feedback. The terminal T sends callback data to the repeater of the site 4 according to the feedback. The repeater of the site 4 sends the callback data of the terminal T to the repeaters of the sites 1 and 2 to achieve callback according to the group call participating site list.

In this embodiment, when a callback collision occurs, the repeater of the site that initiates the group call makes a call right decision, and the first callback establishment request received by the repeater will be accessed, while the same callback establishment request received later will be rejected, thus avoiding callback collision.

Figure 6:
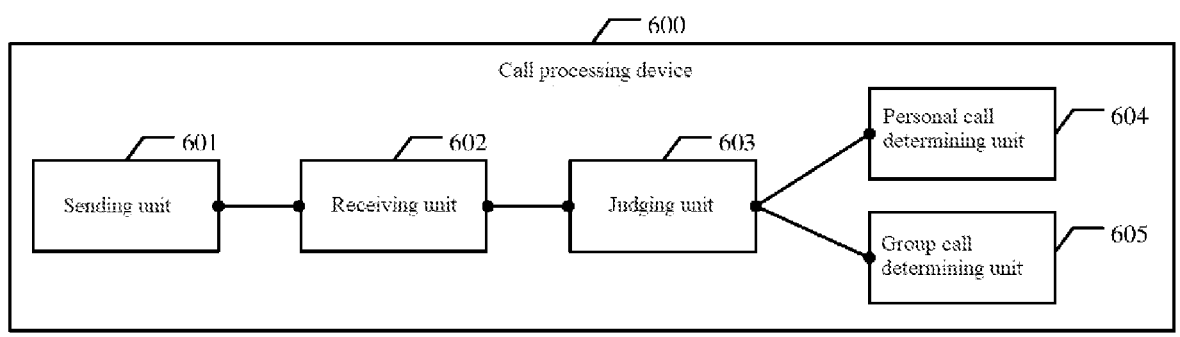
FIG. 6 is a structural diagram of the call processing device according to an embodiment of the present invention.

The following describes the call processing device provided by the embodiment of the present invention. Referring to FIG. 6, the call processing device 600 may be a repeater of a site. In specific, in the embodiments of the present invention, the call processing device 600 comprises:

a sending unit 601, configured to send a first call establishment request to a repeater of other sites according to a call request initiated by a first terminal within the site, the call request of the first terminal being a call request initiated to a second terminal within the other sites, and the first call establishment request comprising an identification of the second terminal;

a receiving unit 602, configured to receive a call establishment response sent by the repeater of the other sites, and receive a second call establishment request sent by the repeater of the other sites, the second call establishment request being sent by the repeater of the other sites according to a call request initiated by the second terminal to the first terminal, and the second call establishment request comprising an identification of the first terminal; and a judging unit 603, configured to judge whether the receiving unit 602 receives the second call establishment request sent by the repeater of the other sites before the call establishment response sent by the repeater of the other sites is received.

The sending unit 601 is also configured to, when the judgment result of the judging unit 602 is yes, send a call collision notification to the first terminal to notify the first terminal to delay the call.

Further, the call request of the first terminal is a personal call request, or the call request of the first terminal is a group call request.

Further, the number of the other sites is more than one, the second terminal is located within any one of the other sites, and the device further comprises:

a personal call determining unit 604, configured to, when the call request of the first terminal is a personal call request, and the receiving unit 602 does not receive the second call establishment request sent by any repeater of the other sites before the call establishment responses sent by all the repeaters of the other sites are received, determine a personal call participating site according to a personal call confirmation message received by the receiving unit 602.

The sending unit 601 is also configured to send call data of the first terminal to the repeaters of the group call participating sites determined by the personal call determining unit, so as to establish a personal call for the first terminal.

Further, the personal call participating site determined by the personal call determining unit 604 is a site that feeds back the personal call confirmation message to the repeater of the first site.

Further, the number of the other sites is more than one, the second terminal is located within any one of the other sites, and the device further comprises:

a group call determining unit 605, configured to, when the call request of the first terminal is a group call request, and the receiving unit 602 does not receive the second call establishment request sent by any repeater of the other sites before the call establishment responses sent by all the repeaters of the other sites are received, determine group call participating sites according to the personal call establishment responses returned by the repeater of each other site.

The sending unit 601 is also configured to send call data of the first terminal to the repeaters of the group call participating sites determined by the group call determining unit 605, so as to establish a group call for the first terminal.

Further, each site is configured with an intra-site group call list, and intra-site group call list comprises an identification of a call group supported by a corresponding site; and the group call participating sites determined by the group call determining unit are the sites where the intra-site group call list comprises the identification of the call group requested by the first terminal.

Further, the receiving unit 602 is also configured to receive a callback establishment request sent by a repeater of one site among the group call participating sites;

the judging unit 603 is also configured to judge whether a callback is being performed by the call processing device with a repeater of another site in the group call participating sites; and the sending unit 601 is also configured to, when the judgment result of the judging unit 603 is yes, send a callback reject response to the repeater of one site among the group call participating sites.

Further, the sending unit 601 is also configured to, before sending the call collision notification to the first terminal, send a call collision report to the repeater of the other sites to inform the repeater of the other sites of a call collision and a coping strategy of the repeater to the call collision.

The call processing device according to the embodiment of the present invention can perform the call processing method described in any of the method embodiments of FIG. 1 to FIG. 5. For the technical implementation process and technical effects thereof, reference may be made to the detailed description of the corresponding method embodiments, which will not be elaborated herein.

Figure 7:
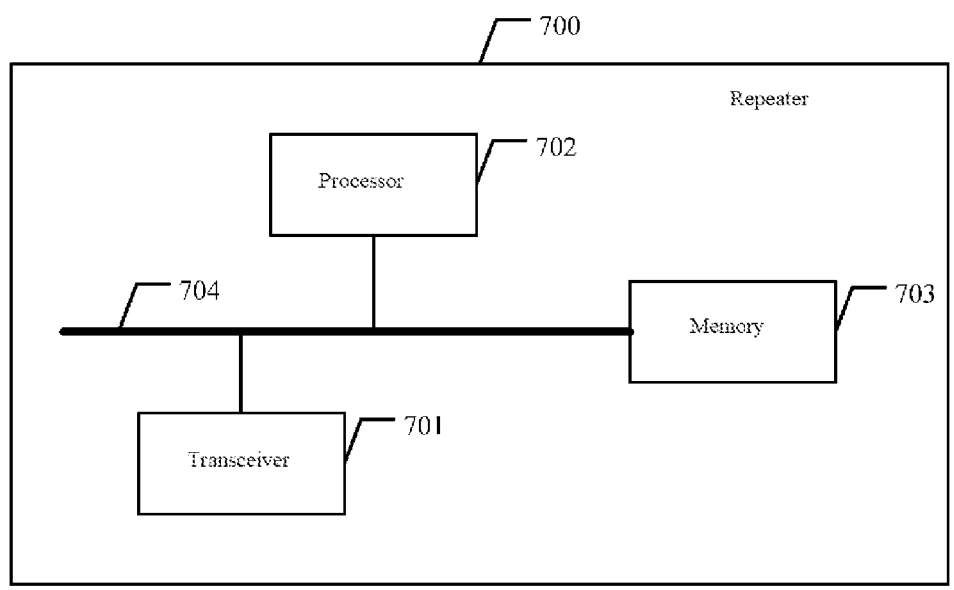
FIG. 7 is another structural diagram of the call processing device according to an embodiment of the present invention.

The following describes the repeater of the embodiment of the present invention from the perspective of the hardware of device. Referring to FIG. 7, the repeater 700 of the embodiment comprises:

a transceiver 701, configured to send a first call establishment request to a repeater of other sites according to a call request initiated by a first terminal within the site, the call request of the first terminal being a call request initiated to a second terminal within the other sites, and the first call establishment request comprising an identification of the second terminal; and a processor 702, configured to judge whether the transceiver 701 receives a second call establishment request sent by the repeater of the other sites before a call establishment response sent by the repeater of the other sites is received, the second call establishment request being sent by the repeater of the other sites according to a call request initiated by the second terminal to the first terminal, and the second call establishment request comprising an identification of the first terminal; and if yes, control the transceiver 701 to send a call collision notification to the first terminal to notify the first terminal to delay the call.

In addition, the call processing device 700 in the embodiment may further comprise a memory 703. The memory 703 is configured to store a software program and cache data. The transceiver 702 and the memory 703 are communicatively connected to the processor 702 through a bus 704.

The call processing device 700 in the embodiment may also perform other steps of the foregoing method embodiments, which will not be elaborated herein.

In addition, it should be noted that the device embodiments described above are only exemplary, in which the units illustrated as separated parts may or may not be physically separated, and the parts displayed as units may or may not be physical units, i.e., can be located in one place, or can be distributed over multiple network units. Some or all of the modules may be selected according to actual needs to achieve the objectives of the solutions in the embodiments. In addition, in the accompanying drawings of the device embodiments provided by the present invention, the connection relationship between the modules indicates that there is a communication connection therebetween, which may be specifically implemented as one or more communication buses or signal lines. Those of ordinary skill in the art can understand and implement without going through any creative efforts.

Through the description of the above embodiments, those skilled in the art can clearly understand that the present invention can be implemented by means of hardware, such as an analog circuit, a digital circuit, or a dedicated circuit. However, software program implementation is a better embodiment for the present invention in more cases. Based on such understanding, the technical solutions of the embodiments of the present invention may be embodied in the form of a software product which is stored in a readable storage medium such as a floppy disc of a computer, a flash memory, a hard disk, a Read-Only Memory (ROM), a Random Access Memory (RAM) or an optical disk which comprises a number of instructions such that one computer equipment (which may be a personal computer, a server, or a network device, etc.) performs the methods described in each of the embodiments of the present invention.

The foregoing descriptions are merely preferred embodiments of the present invention, but the protection scope of the present invention is not limited thereto. Any person skilled in the art can easily think of changes or substitutions within the technical scope of the present invention, and all the changes or substitutions should be covered by the protection scope of the present invention. Therefore, the protection scope of the present invention should be subjected to the protection scope of the claims.

The invention claimed is:

1. A call processing method applied to a call processing system of a trunking communication system comprising a first site and a plurality of second sites, wherein the method comprises:

sending, by a repeater of the first site, first call establishment requests to all repeaters of second sites according to a call request initiated by a first terminal within the first site to establish a call, the call request of the first terminal being a call request initiated to a second terminal within one of second sites, and the first call establishment request comprising an identification of the second terminal;

the repeater of the first site receiving a second call establishment request sent by one of repeaters of the seconds site before the repeater of the first site receives call establishment responses sent by all repeaters of the second sites in response to the first call establishment requests, the second call establishment request being sent by the one of the repeaters of the second sites according to a call request initiated by the second terminal to the first terminal, and the second call establishment request comprising an identification of the first terminal; and sending, by the repeater of the first site, a call collision notification to the first terminal to notify the first terminal to delay the call, the repeater of the first site sending call cancellation requests to all second sites, in order to cancel the call, the one of the repeaters of the second sites sending the call collision notification to the second terminal to notify the second terminal to delay the call, the one of the repeaters of the second sites sending call cancellation requests to repeaters of all other sites, in order to cancel the call.

2. The call processing method according to claim 1, wherein the call request of the first terminal is an individual call request, the repeater of the first site does not receive a second call establishment request sent by one of the repeaters of the second sites before the repeater of the first site receives call establishment responses sent by all the repeaters of the second sites in response to the first call establishment request, the repeater of the first site determines an individual call participating site according to an individual call confirmation message received, and sends call data of the first terminal to a repeater of the determined individual call participating site, so as to establish an individual call for the first terminal.

3. The call processing method according to claim 2, wherein the determined individual call participating site is the second site that feeds back the individual call confirmation message to the repeater of the first site.

4. The call processing method according to claim 1, wherein the call request of the first terminal is a group call request, the repeater of the first site does not receive the second call establishment request sent by one of the repeaters of the second sites before the repeater of the first site receives call establishment responses sent by all the repeaters of the second sites in response to the first call establishment request, the repeater of the first site determines group call participating sites according to call establishment responses returned by each repeater of the second sites, and sends call data of the first terminal to repeaters of the determined group call participating sites, so as to establish a group call for the first terminal.

5. The call processing method according to claim 4, wherein each site is configured with an intra-site group call list, and each intra-site group call list comprises an identification of a call group supported by the corresponding site, wherein the determined group call participating sites are the second sites where the intra-site group call list comprises the identification of the call group requested by the first terminal.

6. The method according to claim 5, wherein the method further comprises:

receiving, by the repeater of the first site, a callback establishment request sent by a repeater of one site among the group call participating sites;
a callback being performed with a repeater of another site among the group call participating sites; and
sending a callback rejection response to the repeater of one site among the group call participating sites.

7. The method according to claim 4, wherein the method further comprises:

receiving, by the repeater of the first site, a callback establishment request sent by a repeater of one site among the group call participating sites;
a callback being performed with a repeater of another site among the group call participating sites; and
sending a callback rejection response to the repeater of one site among the group call participating sites.

8. The call processing method according to claim 1, wherein before the sending, by the repeater of the first site, the call collision notification to the first terminal, the method further comprises:

sending, by the repeater of the first site, a call collision report to the repeaters of the second sites to inform the repeaters of the second sites of a call collision and a coping strategy of the repeater of the first site to the call collision.

9. A call processing device, wherein the call processing device is a repeater of a trunking communication system, wherein the call processing device comprises:

a sending unit, configured to send first call establishment requests to repeaters of a plurality of second sites according to a call request initiated by a first terminal within a first site to establish a call, the call request of the first terminal being a call request initiated to a second terminal within one of second sites, and the first call establishment request comprising an identification of the second terminal;

a receiving unit, configured to receive call establishment responses sent by the repeaters of the second sites in response to the first call establishment requests, and receive a second call establishment request sent by one of the repeaters of the second sites, the second call establishment request being sent by the one of the repeaters of the second sites according to a call request initiated by the second terminal to the first terminal, and the second call establishment request comprising an identification of the first terminal; and a judging unit, configured to judge whether the receiving unit receives the second call establishment requests sent by the one of repeaters of the second sites before the call establishment response sent by all repeaters of the second sites is received, wherein the sending unit being also configured to, when the judgment result of the judging unit is yes, send a call collision notification to the first terminal to notify the first terminal to delay the call, and send a call cancellation request to all second sites, in order to cancel the call, and wherein the receiving unit is also configured to, when the judgement result of the judging unit is yes, receive a call cancellation request from the one of the repeaters of the second sites, in order to cancel the call.

10. The call processing device according to claim 9, wherein the device further comprises:

an individual call determining unit, configured to, when the call request of the first terminal is an individual call request, and the receiving unit does not receive the second call establishment request sent by one of the repeaters of the second sites before the receiving unit receives the call establishment responses sent by all repeaters of the second sites in response to the first call establishment request, determine an individual call participating site according to an individual call confirmation message received by the receiving unit;

wherein the sending unit is also configured to send call data of the first terminal to a repeater of the individual call participating site determined, so as to establish an individual call for the first terminal.

11. The call processing device according to claim 10, wherein the individual call participating site determined by the individual call determining unit is the site that feeds back the individual call confirmation message to the repeater.

12. The call processing device according to claim 9, wherein the device further comprises:

a group call determining unit, configured to, when the call request of the first terminal is a group call request, and the receiving unit does not receive the second call establishment request sent by one of the repeaters of the second sites before the receiving unit receives the call establishment responses sent by all repeaters of the second sites in response to the first call establishment request, determine group call participating sites according to the call establishment responses returned by each repeater of the second sites, wherein the sending unit is also configured to send call data of the first terminal to repeaters of the group call participating sites determined by the group call determining unit, so as to establish a group call for the first terminal.

13. The call processing device according to claim 12, wherein each site is configured with an intra-site group call list, and each intra-site group call list comprises an identification of a call group supported by the corresponding site, wherein the group call participating sites determined by the group call determining unit are the sites where the intra-site group call list comprises the identification of the call group requested by the first terminal.

14. The call processing device according to claim 13, wherein:

the receiving unit is also configured to receive a callback establishment request sent by a repeater of one site among the group call participating sites, the judging unit is also configured to judge whether a callback is being performed by the call processing device with a repeater of another site among the group call participating sites; and the sending unit is also configured to, when the judgment result of the judging unit is yes, send a callback reject response to the repeater of one site among the group call participating sites.

15. The call processing device according to claim 12, wherein:

the receiving unit is also configured to receive a callback establishment request sent by a repeater of one site among the group call participating sites, the judging unit is also configured to judge whether a callback is being performed by the call processing device with a repeater of another site among the group call participating sites; and the sending unit is also configured to, when the judgment result of the judging unit is yes, send a callback reject response to the repeater of one site among the group call participating sites.

16. The call processing device according to claim 9, wherein:

the sending unit is also configured to, before sending the call collision notification to the first terminal, send a call collision report to the repeaters of the second sites to inform the repeaters of the second sites of a call collision and a coping strategy of the repeater to the call collision.

17. A repeater of a call processing system of a trunking communication system, comprising:

a transceiver, configured to send first call establishment requests to repeaters of a plurality of second sites according to a call request initiated by a first terminal within a first site to establish a call, the call request of the first terminal being a call request initiated to a second terminal within one of the second sites, and the first call establishment request comprising an identification of the second terminal; and a processor, configured to judge whether the transceiver receives a second call establishment request sent by the one of the repeaters of the second sites before the transceiver receives call establishment responses sent by all repeaters of the second sites in response to the first call establishment requests, the second call establishment request being sent by the one of the repeaters of the second sites according to a call request initiated by the second terminal to the first terminal, and the second call establishment request comprising an identification of the first terminal, wherein if yes, control the transceiver to send a call collision notification to the first terminal to notify the first terminal to delay the call, and control the transceiver to send a call cancellation request to all second sites, in order to the cancel the call, and control the transceiver to receive a call cancellation request from the one of the repeaters of the second sites, in order to cancel the call.

* * * * *